Aug. 26, 1958          G. R. NATIONS                 2,849,016
                     AIR ELIMINATOR VALVE
Filed April 20, 1955                        2 Sheets-Sheet 1

INVENTOR.
G. R. Nations
BY
ATTORNEY

Aug. 26, 1958    G. R. NATIONS    2,849,016
AIR ELIMINATOR VALVE

Filed April 20, 1955    2 Sheets-Sheet 2

INVENTOR.
G. R. Nations
BY
P. M. McKnight
ATTORNEY

United States Patent Office 2,849,016
Patented Aug. 26, 1958

2,849,016

AIR ELIMINATOR VALVE

Glen R. Nations, Tulsa, Okla., assignor to Oil Capital Valve Company, Tulsa, Okla., a corporation of Oklahoma Application April 20, 1955, Serial No. 502,712

2 Claims. (Cl. 137—202)

This invention relates to improvements in a float operated dump valve and more particularly, but not by way of limitation, to a float valve adapted for utilization as an air eliminator in pipe lines, or the like. This application is an improvement over a pending application Serial No. 344,046, filed on March 23, 1953, by Raymond J. Branson, and with which I am familiar.

It is often found that under normal conditions of operation excessive quantities of air or gas may build up within a flow line system. It will be apparent that careful control of the gases within the line is very important to prevent serious damage resulting therefrom. For instance, excessive air or gas within a suction pump installed on a pipe line may cause an air lock or gas lock in the pump causing an inefficient operation thereof and a need for emergency maintenance. Further, meters installed on a pipe line for the purpose of measuring the quantity of oil or liquid flowing therethrough will measure gas or air as if it were oil, thus excessive air in the line renders an inaccurate metering of the liquid within the line. Since pipe lines usually extend great distances through open fields, across rivers and in many places of difficult accessibility, meter installation, pump installation, and the like, are often disposed at remote positions on the line. It will be apparent that it is often necessary to provide an automatic control of the gases within the line and eliminate air from the line with a minimum of maintenance to the equipment.

The present invention contemplates a novel valve of a float operated type designed to cooperate with the liquid level within the line for opening and closing the valve to automatically maintain a predetermined liquid level therein with a minimum of maintenance. The novel valve may be easily installed within a pipe line immediately upstream from a meter to eliminate the air from the line prior to flow through the meter so that the air will by-pass the meter to re-enter the line downstream thereof, thereby increasing the efficiency of the metering system. The novel valve may also be installed within a line ahead of a suction pump to automatically eliminate the air from the line to avoid any possibility of air lock within the pump thereby assuring a more efficient operaiton thereof.

It is, therefore, an important object of this invention to provide a float valve adapted to cooperate with the fluid level within a flow line to open and close the valve, thereby permitting gas to escape therethrough.

It is a further object of this invention to provide an air eliminator valve to automatically communicate air in a flow line to a by-pass in order to assure a more efficient operation of pipe line installations which may be seriously damaged by air or gas flowing therethrough.

It is another object of this invention to provide a valve for automatically controlling gas quantities within a flow line which may be easily installed at remote places and whih requires a minimum of maintenance to assure an efficient operation thereof, thereby substantially reducing the hazardous conditions normally present when high pressures build up within the flow line.

It is still another object of this invention to provide an efficient float valve which may be utilized as an automatic dump valve to maintain a predetermined fluid level within a tank, or the like.

It is a further object of this invention to provide a float valve for eliminating air from pipe lines, separator tanks, or the like, which is economical in construction and simple and efficient in operation.

Other objects and advantages of the invention will be evident from the following detailed description, read in conjunction with the accompanying drawings, which illustrate my invention.

In the drawings:

Figure 3 is an environmental view depicting the novel valve installed in a separator tank, or the like.

Figure 1:
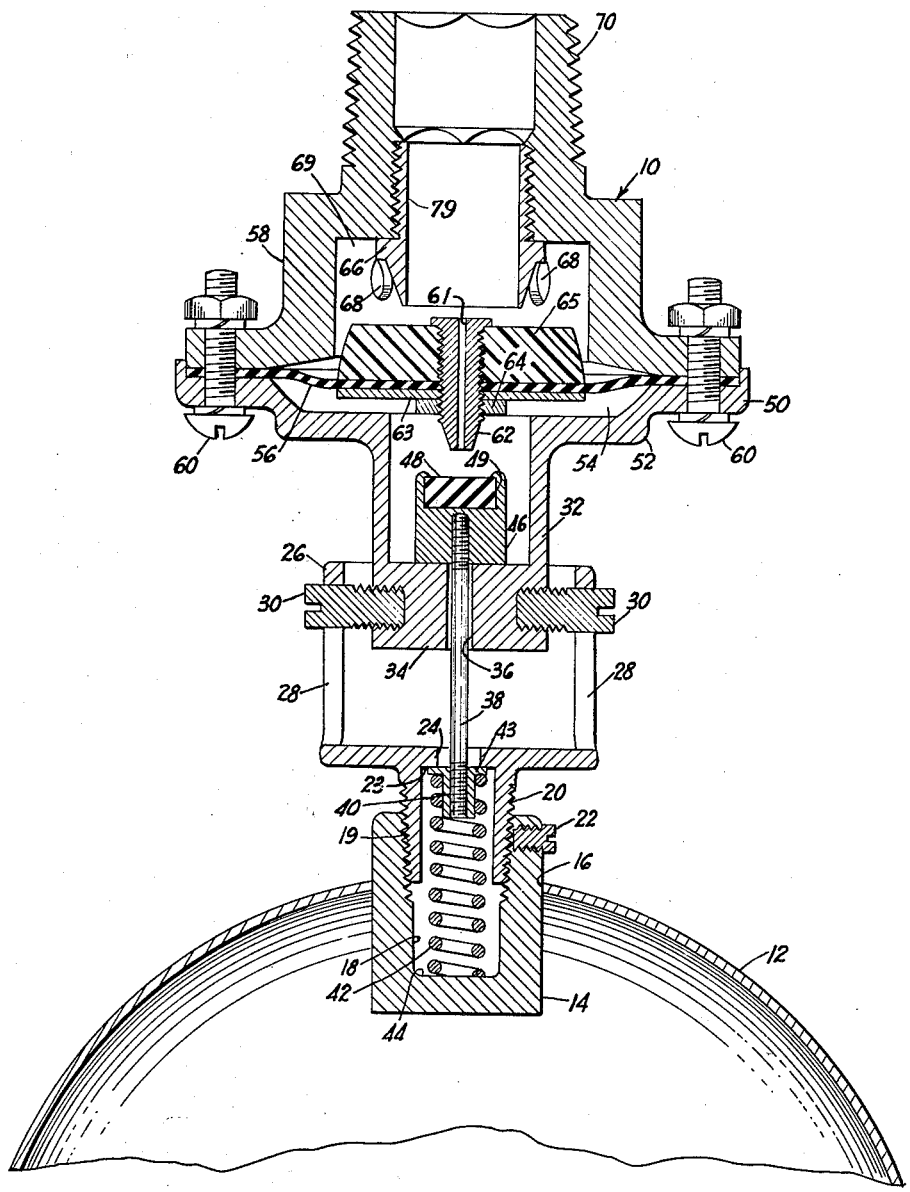
Figure 1 is a vertical sectional view of a float valve embodying the present invention.

Referring to the drawings in detail, reference character 10 represents a float valve apparatus in general having a ball shaped float member 12 provided on the lower portion thereof. A housing 14 extends downwardly into the float 12 through an aperture 16 provided therein and is permanently secured thereto by any suitable means, such as welding, or the like. The housing 14 is provided with a central bore 18 having an upper threaded portion 19 to receive a threaded boss 20. The boss 20 is securely held in position within the housing 14 by a screw 22. The upper end 23 of the boss 20 is restricted by an aperture 24 for a purpose as will hereinafter be set forth. A sleeve 26 of larger diameter than the boss 20 extends upwardly therefrom and is preferably an integral part thereof. A plurality of vertical slots 28 are circumferentially spaced on the sleeve 26 and each is adapted to receive a screw 30. A downwardly extending boss 32 is disposed within the sleeve 26 and is slidably secured therein by the screws 30 which cooperate with the slots 28. It will be apparent that the sleeve 26 may be moved telescopically with respect to the boss 32 through the medium of the screws 30 riding in the slots 28. The vertical movement of the sleeve 26 will be limited by the length of the slots 28. The lower portion 34 of the boss 32 is provided with an aperture 36 in substantial alignment with the aperture 24 of the lower boss 20 to slidably receive a valve stem 38. A flanged sleeve 40 disposed within the boss 20 is threadedly secured to the lower end of the stem 38 to assist in maintaining the stem in position within the aligned apertures. A spring 42 surrounding the sleeve 40 is secured at its upper end to the outwardly extending flange 43 of the sleeve 40 and at its lower end to the bottom 44 of the bore 18. A plug 46 is threadedly secured to the upper end of the stem 38 to cooperate with the flanged sleeve 40 in maintaining the stem 38 in position as shown in Fig. 1. A resilient valve seat 48 is disposed within a recess 49 provided therefor at the top of the plug 46.

The upper portion of the boss 32 terminates in an outwardly extending flange 50 having a shouldered portion 52 to provide a cutaway chamber 54 thereabove. A circular diaphragm 56 is supported at its outer edge by the flange 50 and is firmly secured thereagainst by a substantially bell shaped housing 58 secured to the flange 50 by any suitable means, such as screws 60. A pilot valve 62 having a longitudinal bore 61 extending therethrough is carried by the diaphragm 56 and is secured thereto by a diaphragm holding plate 63 cooperating with a lock nut 64. A sealing member 65 preferably made of nylon, or similar synthetic material having a pliable yet durable and substantially solid characteristic, surrounds the upper portion of the pilot valve 62 to provide a seat for a threaded insert valve 66. The bell housing 58 is provided with a plurality of apertures 68 which permit communication between the exterior of the housing 58 and a chamber 69 above the diaphragm 56 for a purpose as will be hereinafter set forth. The bell housing is further provided with an externally threaded upstanding sleeve 70 adapted to cooperate with the usual pipe fitting or plate 72 (Fig. 2) utilized to install the novel valve in a pipe line, or the like, as will hereinafter be set forth.

Operation

Figure 2:
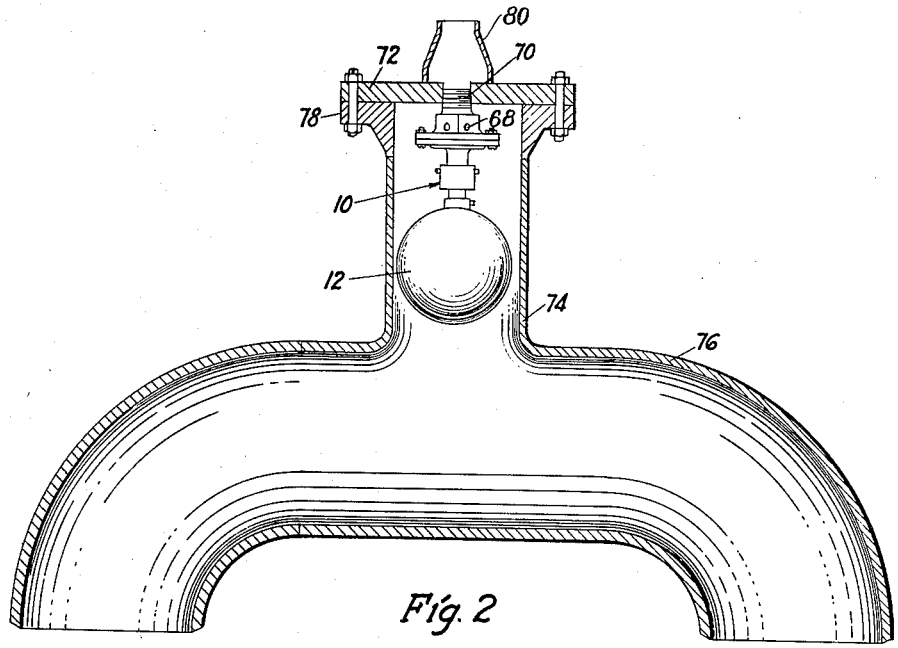
Figure 2 is an environmental view depicting the novel valve installed in a flow line.

In a pipe line installation such as shown in Fig. 2, a T fitting 74 may be welded or the like within a pipe riser 76. It will be understood that the fittings may be interposed at any desired location within the pipe line (not shown) to either eliminate the air or gas therein or to communicate the air to a by-pass for re-entry into the line at another point. A flange member 78 may be secured to the T 74 for receiving the fitting or plate 72 in the usual manner well known in the art. As shown in Fig. 2, the valve 10 may be secured within the upstanding pipe fittings by means of the threaded portion 70 so that the float member 12 is disposed in a downward position. The weight of the float will permit the valve to maintain a normally open position as shown in Fig. 1. Air or gas within the T 74 will enter the ports 68 and fill the chamber 69. The gas in the T 74 will also enter the sleeve 26 through the slots 28 to flow through the passage 36 into the chamber 54. However, the fluid will flow upwardly and out of the chamber 54 through the bore 61 of the pilot valve 62 faster than the flow of fluid coming into the chamber 54 through the bore 36. Thus, the pressure in the chamber 54 will be slightly lower than the pressure in the chamber 69 so that the weight of the seat 65 combined with the weights of the diaphragm plate 63 and lock nut 64 will urge the diaphragm downward to maintain the valve 66 in an open position. The fluid in the chamber 69 will flow upwardly through the bore 79 of open valve 66 to be exhausted to atmosphere. It will be apparent that a by-pass line (not shown) may be connected in any well known manner to the outlet means 80 for communicating the gas to a reservoir, or the like, or to return the gas to the pipe line. As the liquid level (not shown) within the pipe line rises within the riser 76 and the T 74 a sufficient amount to come into contact with the float 12, the float will be lifted therewith. The sleeve 26 rigidly secured to the boss 20, the housing 14 and the float 12 will be lifted simultaneously. The sleeve 26 will slide telescopically upward over the boss 32 to carry the valve seat 48 into contact with the pilot valve 62. A slightly further upward movement of the sleeve 26 will cause the stem 38 to move telescopically with respect to the bore 18 and simultaneously slightly compress the spring member 42. When the valve seat 48 is in contact with the pilot valve 62, the passageway 36 will freely admit the gas pressure from the T 74 into the chamber 54 thereby equalizing the pressure in the chambers 54 and 69. As soon as the pressure on both sides of the diaphragm 56 have thus become equalized, the spring member 42 will expand to its normal position and move the stem 38 upward and cause the diaphragm 56 to flex upwardly to move the valve seat 65 against the valve 66. The slots 28 are of a length to permit the sleeve 26 to move upwardly after the valve seats 65 and 48 have closed the valves 66 and 62 respectively to assure an efficient seal thereof. It will be apparent that the valve stem 38 and the flange sleeve 40 will tend to compress the spring 42, thus causing an upward urging action or tension of the spring to assist in maintaining the valve 10 in a closed position. In this manner the elimination of the air or gas from the line will stop to allow sufficient pressure to build up within the pipe to lower the liquid level to its normal position. This closing action of the valve also prevents any loss of liquid from the line. It will be further apparent that the size and weight of the float member 12 may be calibrated to operate at any desired pressure in order to maintain a predetermined liquid level within the line.

Figure 3:
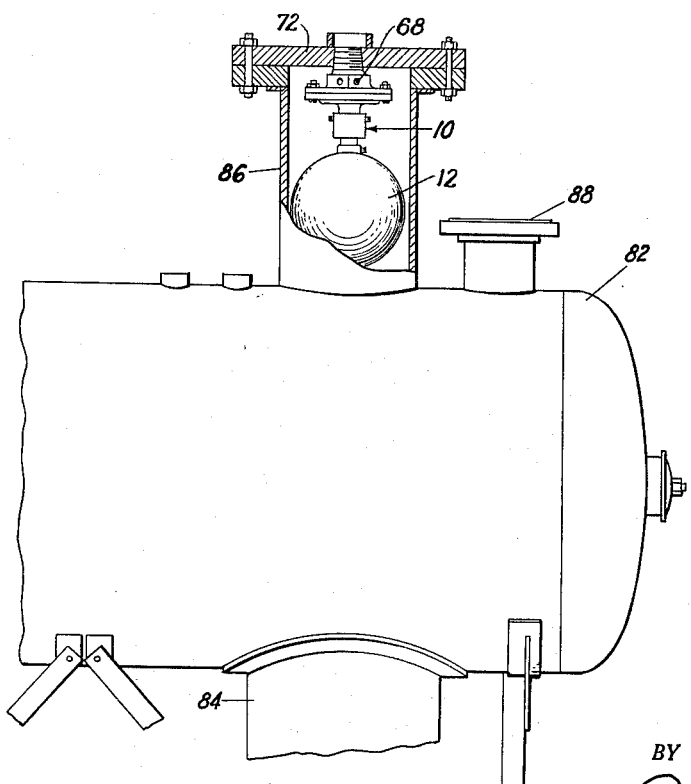

Figure 3 depicts a typical valve installation in a separator tank 82, or the like. In this instance, for example, the tank 82 is for the purpose of separating water and gas from oil. The water filtered from the solution passing through the tank 82 is collected in the water leg 84, the gas is discharged through the stand pipe 86 and the oil is withdrawn at 88. The valve 10 may be installed in the stand pipe 86 in a manner similar to the pipe line installation hereinbefore detailed. The normally open position of the valve will permit the gas to readily escape therethrough either to atmosphere or to storage. As the oil or liquid rises in the tank, however, the float will be lifted therewith to close the valve, thus precluding the passage of liquid therethrough to assure the removal of substantially dry gas.

It will be apparent that the valve 10 may be installed within a storage tank (not shown), or the like, in order to maintain a predetermined liquid level therein. The valve may be disposed within such a tank so that the float 12 will be positioned above the body of the valve. In this manner the weight of the float will maintain the valve in a normally closed position. As the liquid level rises within the tank the float lifts simultaneously therewith to open the valve, thereby permitting liquid to enter the ports 68 into the chamber 69 to be withdrawn through the valve 66. The valve will remain open until the liquid level descends sufficiently to permit the float to lower and close the valve as hereinbefore set forth.

From the foregoing, it will be apparent that the present invention provides a novel float valve adapted to automatically eliminate air or gas from a flow line or to maintain a predetermined liquid level therein. The valve may also be utilized to automatically by-pass air within a flow line around desired pump and meter installations in order to increase the efficiency of such equipment and to prevent serious damage thereto resulting from air flowing therethrough. The novel valve may be installed at remote positions and will require a minimum of maintenance to assure an efficient operation thereof. The valve may also be utilized to automatically maintain a predetermined liquid level in a storage tank or the like.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with a pipe line, a gas eliminator valve comprising a sectional housing, a diaphragm secured within the housing to provide an upper chamber and a lower chamber, means in the upper chamber for providing communication between the interior and exterior thereof, a valve carried by the diaphragm, a passageway therethrough, a valve seat surrounding the valve and disposed in the upper chamber, a second valve, a fluid passageway therethrough, said second valve threadedly secured within the upper chamber and adapted to cooperate with the valve seat therein to intermittently permit exhaust of gas from the upper chamber, a second valve seat slidably disposed within the lower chamber and adapted to cooperate with the first mentioned valve to facilitate the operation thereof, a sleeve telescopically disposed around the lower portion of the housing, a plurality of circumferentially spaced vertical slots provided on the sleeve, a plurality of outwardly extending screws circumferentially disposed on the lower portion of the housing and adapted to cooperate with the slots to provide said telescopic relation, a threaded and apertured boss integral with the lower end of the sleeve member and having a threaded cap member secured thereon, a valve stem extending downwardly from the second valve seat through the bottom of the housing, through the apertured boss, and into the cap member a flanged sleeve threadedly secured to the lower end of the stem, a spring surrounding the flanged sleeve and having one end anchored thereto and the opposite end anchored to the cap member, a float member rigidly secured to the cap member and responsive to fluid level differential within the line and cooperating with the sleeve to permit alternately opening and closing of both valves, and means for securing the valve in the pipe line.

2. An air eliminator valve comprising a float member responsive to fluid level differentials, a housing secured to the float member and carried thereby, a sleeve member threadedly secured within the housing, a pair of diametrically opposed vertically disposed slots provided in the sleeve, a boss member extending downwardly in the sleeve, means cooperating with the slots and boss member to provide a telescopic movement between the sleeve member and the boss upon reciprocal movement of the float member, vertically aligned apertures provided in the sleeve member and the boss member, a valve stem disposed therethrough and extending into the housing, a flanged sleeve threadedly secured to the lower end of the stem, a helical spring surrounding the flanged sleeve and having one end anchored thereto and the opposite end anchored to the bottom of the housing, a valve seat secured to the upper end of the valve stem, an outwardly extending flange provided on the upper portion of the boss member, a substantially bell shaped housing secured to the flange, a diaphragm secured between the flange and the bell shaped housing, a pilot valve having a fluid passageway therethrough carried by the diaphragm and adapted to cooperate with the valve seat, a diaphragm plate, a nut provided to cooperate with the diaphragm plate to secure the pilot valve in the diaphragm, a main valve seat disposed on the upper side of the diaphragm around the pilot valve, a main valve threadedly secured within the bell housing and adapted to cooperate with the main valve seat, a plurality of circumferentially spaced apertures provided in the bell housing to provide communication between the exterior and interior thereof, and a bore extending vertically through the main valve to provide an exhaust passage from the interior of the valve, said main valve interposed between the apertures and the bore to permit flow of pressure through the valve in an open position thereof to the exhaust passage, and said valve stem adapted for reciprocal movement by the float member for operation of the valve members.

References Cited in the file of this patent
UNITED STATES PATENTS

| | | |
|---|---|---|
| 1,523,526 | Hedges | Jan. 20, 1925 |
| 2,599,498 | Suska | June 3, 1952 |
| 2,781,772 | Russell | Feb. 19, 1957 |